(12) United States Patent
Nielsen et al.

(10) Patent No.: US 11,965,377 B2
(45) Date of Patent: Apr. 23, 2024

(54) SEALANT IN A VACUUM INSULATED GLAZING UNIT

(71) Applicant: VKR HOLDING A/S, Hørsholm (DK)

(72) Inventors: Karsten Hansgaard Nielsen, Hørsholm (DK); Utku Ahmet Özden, Hørsholm (DK)

(73) Assignee: VKR HOLDING A/S., Horsholm (DK)

( * ) Notice: Subject to any disclaimer, the term of this patent is extended or adjusted under 35 U.S.C. 154(b) by 382 days.

(21) Appl. No.: 17/311,703

(22) PCT Filed: Dec. 12, 2019

(86) PCT No.: PCT/DK2019/050387
§ 371 (c)(1),
(2) Date: Jun. 8, 2021

(87) PCT Pub. No.: WO2020/141007
PCT Pub. Date: Jul. 9, 2020

(65) Prior Publication Data
US 2022/0025697 A1  Jan. 27, 2022

(30) Foreign Application Priority Data

Jan. 2, 2019 (DK) .............................. PA201970002

(51) Int. Cl.
*E06B 3/66* (2006.01)
*E06B 3/677* (2006.01)

(52) U.S. Cl.
CPC .......... *E06B 3/6612* (2013.01); *E06B 3/6775* (2013.01)

(58) Field of Classification Search
CPC .............................. E06B 3/6612; E06B 3/6775
See application file for complete search history.

(56) References Cited

U.S. PATENT DOCUMENTS 5,664,395 A * 9/1997 Collins ................. E06B 3/6612
  52/786.13
8,595,994 B1 * 12/2013 Grommesh ......... E06B 3/66304
  52/204.593

(Continued)

FOREIGN PATENT DOCUMENTS

CN  107265889 A * 10/2017
EP  1422204 B1 * 6/2012 ............. C03C 27/06

*Primary Examiner* — Rodney Mintz
(74) *Attorney, Agent, or Firm* — CANTOR COLBURN LLP

(57) ABSTRACT

A vacuum insulated glazing unit comprising a first glass sheet and a second glass sheet separated by a gap, with one or more support structures arranged in said gap, and a side seal arranged near the periphery of said glass sheets and enclosing said gap, wherein one of said glass sheets comprises an evacuation hole and an evacuation member, and a sealing material providing a hermetic seal between the evacuation member and said glass sheet, and the sealing material having a sealing material surface extending between a first intersection defined between a surface of the glass sheet and the sealing material surface and a second intersection defined between the evacuation member and the sealing material surface, wherein said sealing material surface at the first intersection has a first contact angle defined between said sealing material surface and the surface of the glass sheet, which first contact angle is below 40 degrees.

16 Claims, 6 Drawing Sheets

(56) References Cited

U.S. PATENT DOCUMENTS

| | | | |
|---|---|---|---|
| 8,900,396 B2* | 12/2014 | Kwon | H01J 9/40 156/293 |
| 2012/0148795 A1* | 6/2012 | Kwon | H01J 9/40 428/131 |
| 2020/0399949 A1* | 12/2020 | Pasionek | E06B 3/6775 |
| 2021/0301588 A1* | 9/2021 | Molbo | B32B 17/10302 |
| 2021/0381304 A1* | 12/2021 | Krisko | E06B 3/6775 |

* cited by examiner

SEALANT IN A VACUUM INSULATED GLAZING UNIT

TECHNICAL FIELD

The disclosure relates to a vacuum insulated glazing (VIG) unit comprising a sealant for sealing an evacuation hole in a glass pane of the VIG unit, wherein the sealant is of a sealant shape providing an increased sealing efficiency and increased durability of the VIG unit.

BACKGROUND

Vacuum insulated glazing (VIG) units comprise a compact sandwich structure having glass sheets arranged with an evacuated interior gap in between. The vacuum void within the interior gap advantageously provides enhanced thermal insulation and sound insulation resulting in an energy-saving and comfort-enhancing window pane. The vacuum level is maintained by means of the enclosing elements of the VIG unit, e.g. the glass sheets, the peripheral side seal and the sealing of the evacuation opening(s), through which the evacuation of the void was executed. The durability of these elements is therefore detrimental to the efficiency and lifetime of the VIG unit.

Patent document no. EP 1 422 204 B1 describes the use of low melting point glass a side sealing material peripherally enclosing the interior gap, where the sealing efficiency of the seal is decreased when the seal surface directed towards the interior gap is of a concave surface shape with sharp edge portions at the glass sheet surfaces which are highly sensitive to damage when forces, e.g. due to wind pressure, are applied to the VIG unit. To reduce the risk of damage, bulging surface shapes of the seal was employed instead.

The present disclosure addresses the continuous desire to provide improved VIG units having improved insulating properties and increased lifetime.

BRIEF SUMMARY

The present disclosure relates to a vacuum insulated glazing unit comprising
- a first glass sheet and a second glass sheet arranged in parallel, wherein each glass sheet comprises an exterior surface and an interior surface, wherein the interior surfaces of the glass sheets are opposing each other and separated by a gap,
- one or more support structures arranged in said gap,
- a side seal arranged near the periphery of said glass sheets and enclosing said gap, and wherein one of said glass sheets comprises
- an evacuation hole enclosed by an evacuation hole surface extending from the interior surface to the exterior surface of the glass sheet,
- an evacuation member comprising an outer member surface,
- a sealing material providing a hermetic seal between the outer evacuation member surface and said glass sheet, and the sealing material having a sealing material surface extending between a first intersection defined between a surface of the glass sheet and the sealing material surface and a second intersection defined between the outer evacuation member surface and the sealing material surface,
- wherein said sealing material surface at the first intersection has a first contact angle defined between said sealing material surface and the surface of the glass sheet, which first contact angle is below 45 degrees, such as below 40 degrees.

During the manufacture of the VIG unit, elements of the VIG unit, especially the material properties of the glass sheets and the sealing material are affected by temperature changes, especially affected are the viscosity and volume of the materials. The sealing material is heated to a temperature where it flows and forms the seal by bonding to the surfaces of the glass sheet and of the evacuation member. Upon cooling of the seal material, it will harden to non-flowing state and it will contract differently from, often more than the material of the glass sheet and so that a shear force is induced between the hermetic seal and the surface of the glass sheet which are bonded together. The present aspect as disclosed above provides several advantages as the contact angle between the glass surface and the sealing material is low, at least below 45 degrees resulting in a reduced thickness of sealing material deposited on the glass sheet surface in particularly near the outer edge of the hermetic seal. By having a reduced or limited thickness of the hermetic seal, the shear forces between the sealing material and the surface of the glass sheet caused by the thermal contraction of the sealing material is likewise reduced, which reduces the risk of fractures and cracks in the hermetic seal and/or the glass sheet caused by the shear forces.

By lessening the mutual force impacts of the bonded elements, it in turn reduces the risk of cracks within the glass sheets or the sealing material when the VIG unit is produces, especially when undergoing cooling. Furthermore, by lessening the mutual force interaction between the elements, any stress or strain applied to the VIG unit during use, e.g. due to wind or temperature changes causing e.g. flexing of the windows, will also be less probable to cause cracks and deterioration of the VIG unit.

Another advantage of the present aspect provides a decrease in sealing material protruding from the glass pane surface, which in turn decreases the risk of knocking the final seal of the evacuation hole off the VIG unit. The smaller amount of sealing material used in turn decreases usage of sealing material and thereby the production cost of the VIG unit.

VIG units are normally made from glass sheets kept separated by support structures such as pillars arranged in an airtight and evacuated gap between the glass sheets. To provide the airtight gap, an edge sealing is provided along the glass sheet edges to enclose the gap between the glass sheets. This edge seal may be made from e.g. a glass frit material such as low melting point glass frit material, which is applied along the edges of a glass sheet and then subsequently heated in order to melt the glass material to provide an airtight and strong edge sealing. The edge seal may alternatively be made from a metal seal, which is heated to a melting point and then cooled to cure.

The gap(s) between the glass sheets are normally evacuated by means of an evacuation cup connected to an evacuation pump, and the evacuation cup is arranged to cover an evacuation hole in one of the glass sheets for the VIG unit, which is then sealed after the evacuation of the gap. Alternatively, the gap may be evacuated in an evacuation chamber enclosing the entire VIG unit. The gap is normally evacuated to below $10^{-3}$ bar, such as below $10^{-4}$ bar, e.g. to about or below $10^{-3}$ mbar.

The glass sheets are typically of a thickness or 3 or 4 mm, and preferably at least one of the glass sheets is a tempered glass sheet.

The evacuation member is preferably a glass tube, which after evacuation has been closed off by a so-called tip-off heating of the distal tip of the glass tube, causing the tip to melt and form an airtight closure of the evacuation tube and thereby together with the hermetic seal a closure of the evacuation hole. By choosing a glass tube for an evacuation member, the mutual thermally induced stresses between the glass sheet, the hermitic seal, in particularly if made of solder glass and the evacuation tube are reduced as the materials of the three elements have thermal characteristics that resembles each other as opposed to e.g. choosing an evacuation member made from a metal as copper or brass.

The sealing material is preferably a low melting point solder glass material.

The sealing material should have a melting temperature sufficiently low to allow the material to be heated to a flowing state in order to form the hermetic seal during manufacturing of the VIG unit without having an excessive adverse effect on the tempering or other features of the glass sheet in which the evacuation hole is formed. Generally, the sealing material should have properties to be able to flow during manufacturing of the VIG unit to form the hermetic seal at a temperature in the range of 150 to 550° C., in particularly in the range of 300 to 400° C.

However, other materials such as metal solder material could also be considered for the sealing material.

The contact angle is a measure of the angle where the glass surface meets the sealing material surface, where the sealing material surface is the interface between the sealing material and the atmosphere on the exterior of the VIG unit. A tangent to the point where the sealing surface meets the glass surface may be drawn to ease the measure of the contact angle. The contact angle defined in relation to the present disclosure is the equilibrium contact angle provided in the finished VIG unit.

The first contact angle is preferably more than 10 degrees, such as more than 15 degrees. Furthermore, the first contact angle is preferably less than 35 degrees, such as less than 30 degrees.

The above-discussed limitation to the thickness of the hermetic seal, expressed in the limitation to the first contact angle, is in particular advantageous in a vacuum insulated glazing unit, wherein the evacuation hole comprises at least a first hole part and a second hole part adjacently arranged in the thickness direction of the glass sheet measured along a first axis extending substantially perpendicular to the exterior surface of the glass sheet, the first hole part is arranged between the exterior surface of the glass sheet and the second hole part,
the second hole part is arranged between the first hole part and the interior surface of the glass sheet, and
wherein the first hole part is of a first diameter and the second hole part is of a second diameter, wherein the first diameter is larger than the second diameter, and wherein the evacuation member is positioned at least partially in said first hole part.

In this case, the sealing material will flow into the gap created between the evacuation member and the inner surface of the first hole part, and the contracting shear force exerted on the glass sheet by the hermetic seal due to the thermal contraction of it after the hermetic seal is formed will make it even more likely to result in formation of cracks and fractures of the glass sheet.

In an alternative embodiment, the vacuum insulated glazing unit has an evacuation hole comprising at least a first hole part, a second hole part and a third hole part adjacently arranged in the thickness direction of the glass sheet measured along a first axis extending substantially perpendicular to the exterior surface of the glass sheet, the first hole part is arranged between the exterior surface of the glass sheet and the second hole part,
the second hole part is arranged between the first hole part and third hole part, and
the third hole part is arranged between the second hole part and the interior surface of the glass sheet,
wherein the first hole part is of a first diameter, the second hole part is of a second diameter and the third hole part is of a third diameter, wherein the first diameter is larger than the second diameter and the third diameter, and the second diameter is larger than the third diameter, wherein the evacuation member is positioned at least partially in said first hole part and said second hole part.

In this case, the sealing material will flow into the gap created between the evacuation member and the inner surface of the second hole part, and the contracting shear force exerted on the glass sheet by the hermetic seal due to the thermal contraction of it after the hermetic seal is formed will make it even more likely to result in formation of cracks and fractures of the glass sheet.

In both cases, the first diameter is preferably between 6-12 mm, such as between 8-10 mm, whereas the second diameter preferably is between 3-7 mm, such as between 4-6 mm. The third diameter is preferably between 1.5-3.0 mm, such as between 2.0-2.5 mm.

The sealing material surface is in a preferred embodiment of a surface shape providing a second contact angle defined between said sealing material surface and said outer evacuation member surface, which is below 45 degrees, such as below 40 degrees.

Likewise the first contact angle, the limitation on the magnitude of the second contact angle reduces the magnitude of the shear forces between the hermetic seal and the surface of the items it is bonded to, for the second contact angle this is particularly to the evacuation member, and the limitations to the magnitude of the second contact angle reduces the risks of formation of cracks and fractures in the hermetic seal and/or in the evacuation member.

The second contact angle is preferably more than 10 degrees, such as more than 15 degrees. Furthermore, the second contact angle is preferably less than 35 degrees, such as less than 30 degrees.

It is advantageous that said first contact angle is smaller than a second contact angle defined between said sealing material surface and said outer evacuation member surface.

The sealing material is preferably devoid of lead material.

In a preferred embodiment, the evacuation member is a tube comprising an outer tube surface and an inner tube surface.

According to another preferred embodiment, the sealing material surface has a concave surface curvature which at least at a first point on the sealing material surface has a first radius of surface curvature measured in a plane perpendicular to the exterior glass sheet surface is in the range of 0.5 to 4.0 mm, such as in the range of 0.5 to 2.5 mm, in particular in the range of 1.5 to 2.5 mm. Thus, the concave shape of the sealing material surface means that the thickness of the hermetic seal is reduced that thereby the magnitude of the shear forces caused by the thermal contraction of the sealing material after formation of the hermetic seal as discussed previously. This concavity of the sealing material surface may constitute an disclosure by itself as detailed below.

It is preferred that the first radius of surface curvature of the sealing material surface at any first point located within a sealing material surface segment defined as representing at least 30% such as at least 40% of the sealing material surface is within said range.

The sealing material surface segment is preferably centred about a mid-point defined as the point located at approximately equal distances from the first and second intersections.

It is furthermore preferred that at least 30%, such as at least 35%, or such as at least 40% of the sealing material surface segment is of a radius of curvature which is varying with less than 10%.

In a particular second aspect, the present disclosure relates to a vacuum insulated glazing unit comprising
- a first glass sheet and a second glass sheet arranged in parallel, wherein each glass sheet comprises an exterior surface and an interior surface, wherein the interior surfaces of the glass sheets are opposing each other and separated by a gap,
- one or more support structures arranged in said gap,
- a side seal arranged near the periphery of said glass sheets and enclosing said gap, and wherein one of said glass sheets comprises
- an evacuation hole enclosed by an evacuation hole surface extending from the interior surface to the exterior surface of the glass sheet,
- an evacuation member comprising an outer member surface,
- a sealing material providing a hermetic seal between the outer evacuation member surface and said glass sheet, and the sealing material having a sealing material surface extending between a first intersection defined between a surface of the glass sheet and the sealing material surface and a second intersection defined between the outer evacuation member surface and the sealing material surface,
- wherein said sealing material surface has a concave surface curvature which at least at a first point on the sealing material surface has a first radius of surface curvature measured in a plane perpendicular to the exterior glass sheet surface is in the range of 0.5 to 4.0 mm, such as in the range of 0.5 to 2.5 mm, in particular in the range of 1.5 to 2.5 mm.

The vacuum insulated glazing unit according to the second aspect may comprises one or more of the features according to any of the embodiments of the first aspect of the present disclosure.

The radii of curvatures are generally calculated based on the radius of an osculating circle in a given point, e.g. the radius of curvature of the sealing material surface at the first point P1 is the radius of an osculating circle in said first point P1. An osculating circle of the curve at a point P is the circle that has the same tangent as the curve at that point P and the same curvature. The resulting osculating circle has a centre, being the centre of curvature for point P. The osculating circle may be regarded as the best-fit circle that approximates the curve at the point P, e.g. the radii of curvature may be based on a calculation of the best-fit circle to a surface curve of the sealing material at the first point P1.

BRIEF DESCRIPTION OF THE DRAWINGS

Aspects of the present disclosure will be described in the following with reference to the figures in which:

FIG. 1b shows an area near the evacuation hole seal of the VIG unit of FIG. 1a.

DETAILED DESCRIPTION

Figure 1A:
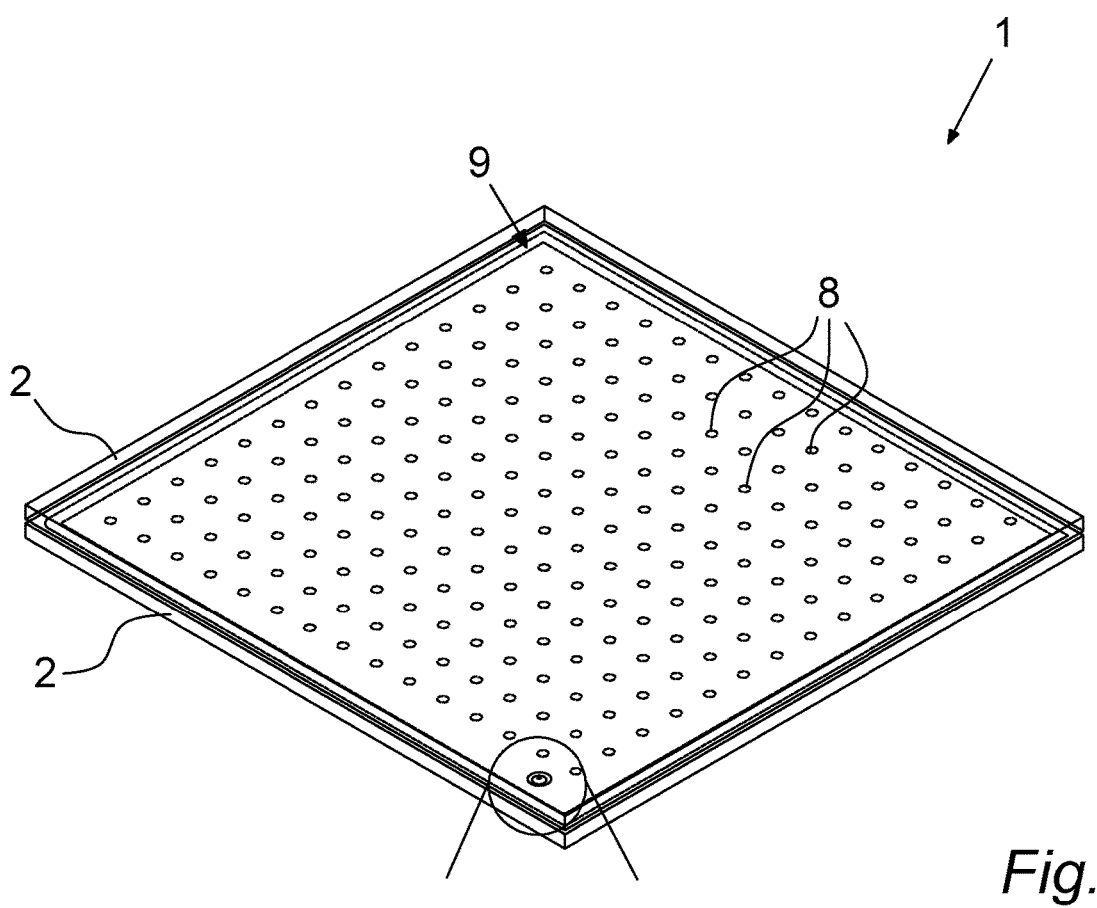
FIG. 1a shows a vacuum insulated glazing (VIG) unit according to the present disclosure.
Figure 1B:
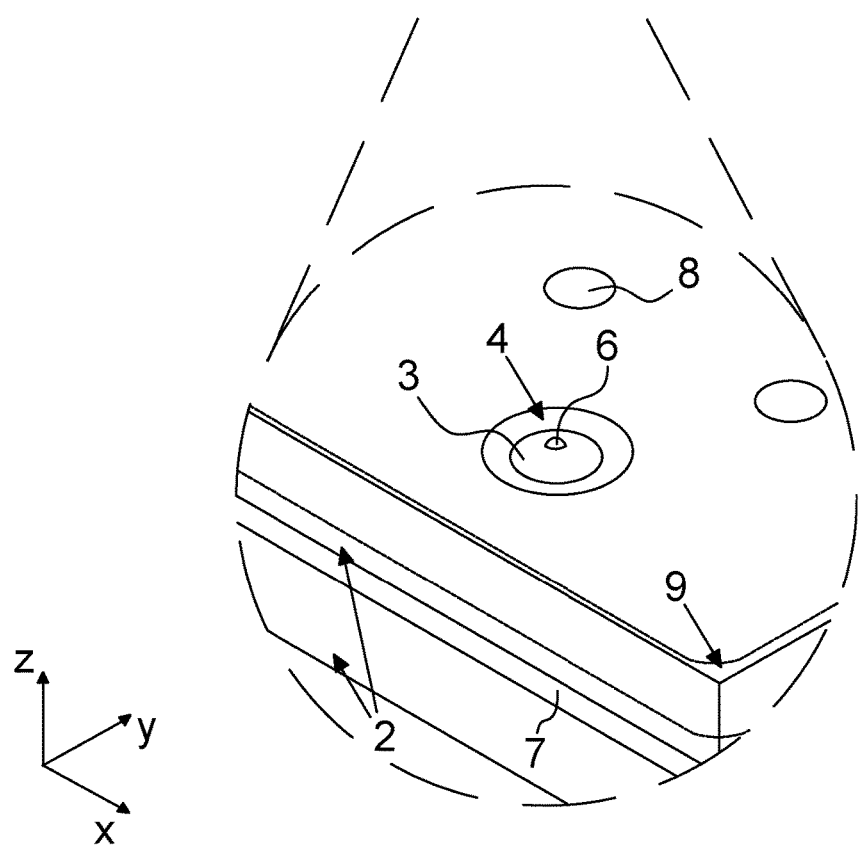

FIGS. 1a and 1b illustrates a VIG unit 1 according to embodiments of the present disclosure, shown in perspective. The VIG unit shown in FIG. 1a comprises two glass sheets 2 arranged such that the major surfaces 2a, 2b of the glass sheets 2 are substantially arranged in parallel. The glass sheets 2 are separated by a gap 7 maintained by support structures 8 and a peripheral side seal 3. The gap 7 has been depressurised through the evacuation hole, preferably to a level of high vacuum. The support structure 8 in the present example comprises a plurality of spacers 8, such as metal spacers 8, which are separated at equal distances in a repeated pattern between the interior surfaces of the glass sheets 2.

FIG. 1b shows a zoomed-in view of the area near the evacuation hole 4 of FIG. 1a. In the present example, an evacuation member 6 in the shape of a tube is positioned in the evacuation hole 4 and sealed to the evacuation hole 4 by a sealing material 3 forming a hermetic seal. The sealing material 3 surrounds and encloses the evacuation tube 6 in the x-y plane so as to provide a seal from the outer surface 6b of the tube 6 to the evacuation hole surface 5. Initially, during manufacture of the VIG unit, the evacuation tube 6 provides a pathway for gaseous material through the evacuation hole 4, from the interior space 7, arranged between the interior glass sheet surfaces 2a, to the exterior space at the exterior surfaces 2b of the glass sheets 2, external from the VIG unit 1. After evacuation of the interior space 7 created by the gap in the VIG unit 1, the evacuation member 4 is sealed in order to hermetically seal the interior space 7 from the atmosphere exterior to the VIG unit 1.

Method of Making the Hermetic Seal

In FIGS. 1*a* and 1*b* the evacuation hole 4 provides for the sealing material 3 to be at least partially positioned below the exterior surface 2*b* of the glass sheet 2 in which the evacuation hole 4 is established. This allows for the sealing assembly comprising the sealing material 3 and the evacuation member 6 to protrude less from the exterior surface 2*b* of the glass sheet 2, and thereby decreasing the probability of damaging the assembly upon manufacturing the VIG unit 1 and in the final VIG unit 1.

An x, y, z coordinate system is indicated in FIGS. 1*a*-1*b*. For the purpose of this disclosure, and as depicted in FIGS. 1*a*-1*b*, the VIG unit 1 is described in an orientation, such that the major interior 2*a* and exterior surfaces 2*b* of the glass sheets 2 extend in the x-y plane, while the thickness of the glass sheets 2 and the VIG unit 1 extends in the z-direction. FIGS. 2-5 show a cross-sectional view in the z-y plane of the area near the evacuation hole 4 of VIG unit 1 according to the present disclosure.

In the present examples shown in FIG. 1-5, the evacuation member 6 is an evacuation tube 6 having an interior void extending between an opening at the distal tube tip, and an opening at the proximal tube end. The void has once provided a pathway during depressurising of the interior gap 7 but the pathway is closed in the final VIG unit 1. Depending on the tube material, the tube may be closed by sealing the opening at the tip of the tube protruding away from the interior gap 7, either by clamping or by heat treatment or other suitable methods. In one or more examples, the evacuation tube 6 may be made of glass and sealed by the application of heat, e.g. the tube is heated by a local heater at approximately 1000 degrees C. for 10-20 seconds to melt the tip of tube 6 and close the pathway from the outside of the VIG unit to the interior of the tube and the interior space of the VIG unit. In the process, a heat shield may be preferably used between the sealing material 3 and the heater to protect the seal provided by the sealing material 3.

Figure 2A:
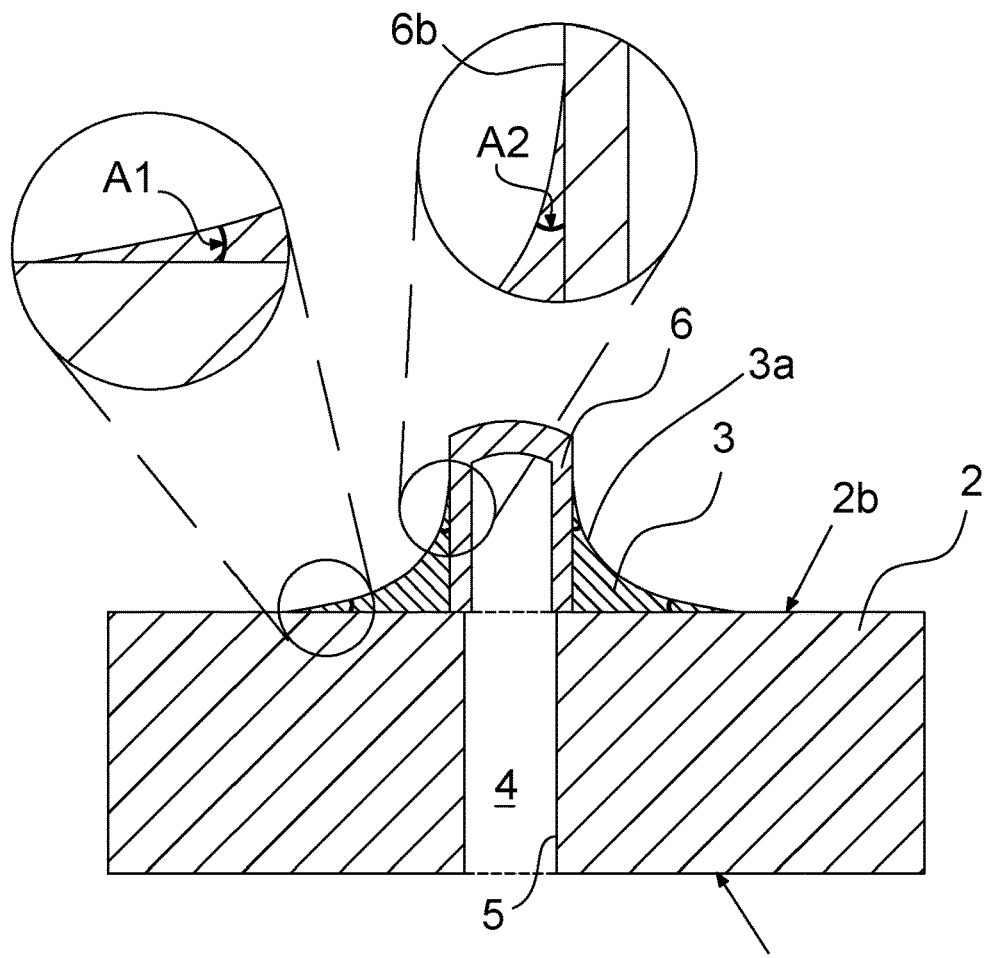
FIG. 2a shows an evacuation hole seal according to the present disclosure arranged on the exterior surface of the VIG unit, and with a first and second contact angle below 45 degrees.
Figure 2B:
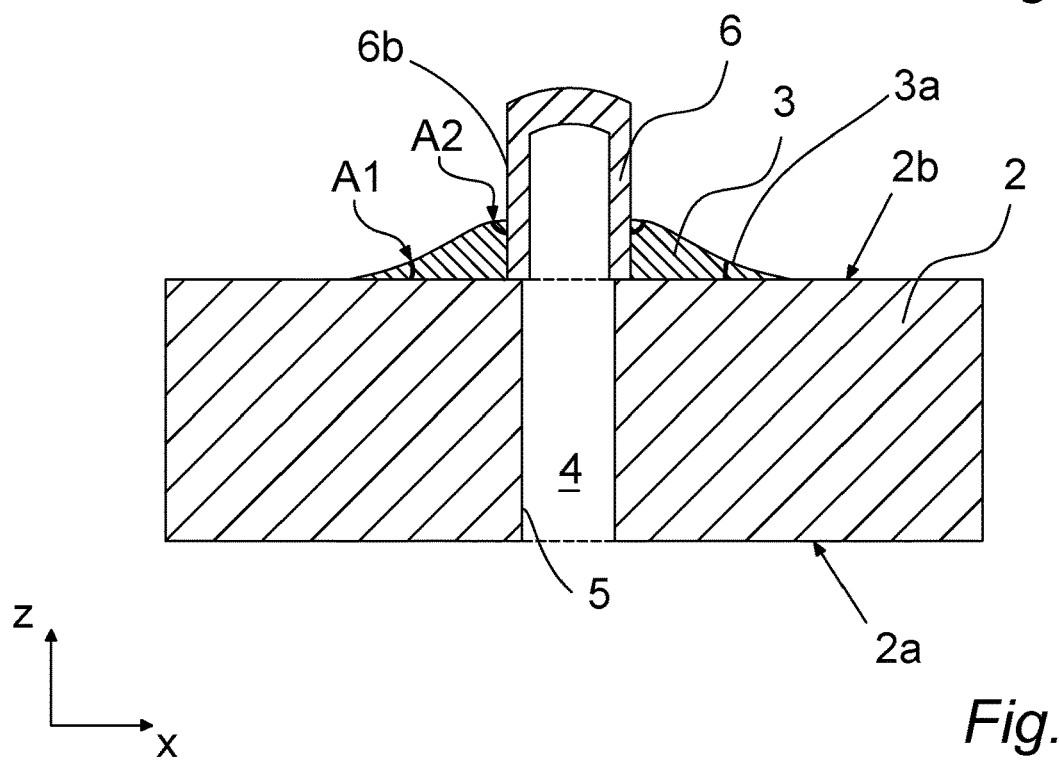
FIG. 2b shows an evacuation hole seal with a first contact angle below 45 degrees and a second contact angle around 90 degrees.
Figure 2C:
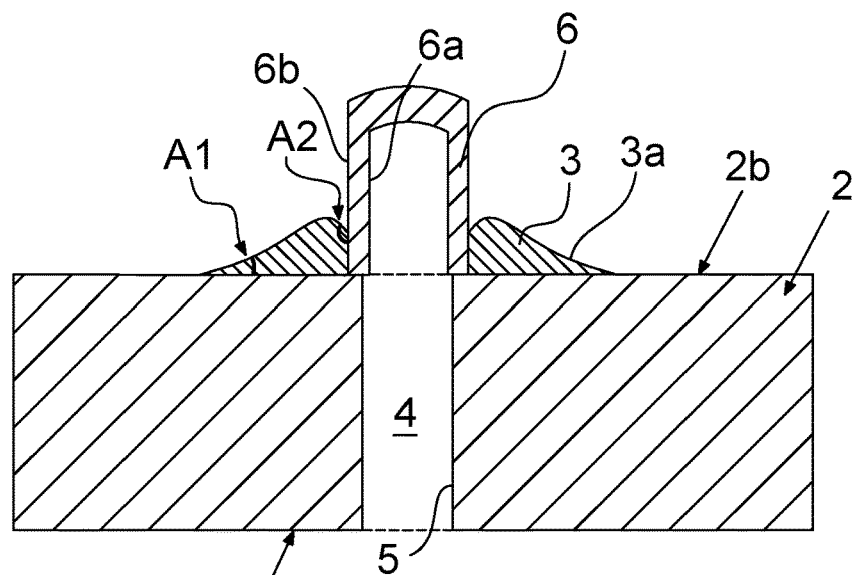
FIG. 2c shows an evacuation hole seal with a first contact angle below 45 degrees and a second contact angle above 90 degrees.

FIGS. 2*a*-2*c* shows a cross-sectional view in the x-z plane of an evacuation hole 4, sealing material 3 and an evacuation member 6 of a VIG unit according to the present disclosure. The evacuation hole 4 extends from the interior surface 2*a* of the glass sheet 2 to the exterior surface 2*b* of the glass sheet 2. The opening provided by the evacuation hole 4 is surrounded by the glass sheet 2 providing an evacuation hole surface 5 at the interface between the opening and the glass sheet 2. The evacuation hole 4 is covered by the closed evacuation tube 6 provided on, and preferably abutting, a part of the exterior surface 2*b* of the glass sheet 2. The evacuation hole 4 is hermetically sealed by the sealing material 3 provided around the evacuation tube 6 and bonded to at least a part of the outer tube surface 6*b* and the adjacent exterior surface 2*b* of the glass sheet 2. The assembly, comprising the sealing material 3 and the evacuation tube 6 provides a hermetic seal of the evacuation hole 4 and in turn of the interior gap 7 of the VIG unit 1.

FIG. 2*a* shows an example of the final sealing material 3 shape of a VIG unit 1 according to the present disclosure. The shape of the sealing material 3 providing a hermetic seal is shaped such that the cross-sectional surface shape of the sealing material 3 is of a concave shape. The edge parts of the sealing material, where the surface of the sealing material approaches the outer tube surface 6*b* and the exterior glass sheet surface 2*b*, are thin, thereby providing small contact angles. The area in which the first contact angle (A1) is measured, being the angle between the sealing material surface 3*a* and the exterior glass sheet surface 2*b*, is shown in an exploded view in FIG. 2*a*. The area in which the second contact angle (A2) is measured, being the angle between the sealing material surface 3*a* and the outer surface 6*b* of the evacuation tube 6, is also shown in an exploded view in FIG. 2*a*. As shown in these exploded views, the first contact angle (A1) is measured as the angle that has to be undertaken from the glass sheet surface 2*b* to the seal material surface 3*a*, along a pathway extending through the sealing material 3. Similarly, the second contact angle (A2) is measured as the angle that has to be undertaken from the outer evacuation tube surface 6*b* to the sealing material surface 3*a*, along a pathway extending through the sealing material 3.

Specifically, the contact angles of the present disclosure can be measured based on a profile showing the sealing material 3 bonded to the glass sheet surface 2*b* and the evacuation member 6. Based on the profile, such as those depicted in FIGS. 2-5, the first contact angle (A1) can be calculated by first determining the gradient of the tangent of the sealing material surface 3*a* at the point where it meets the glass sheet surface, which e.g. in the present examples in FIGS. 2*a* and 2*b* is the exterior glass sheet surface 2*b*. The first contact angle is then calculated as the angle between the glass sheet surface and the gradient. Based on the profile, again such as those depicted in FIGS. 2-5, the second contact angle (A2) can be calculated by first determining the gradient of the tangent of the sealing material surface 3*a* at the point where it meets the outer surface 6*b* of the evacuation member 6, which e.g. in the present examples is an evacuation tube 6. The second contact angle (A2) is then calculated as the angle between the outer surface 6*b* of the evacuation member 6 and the gradient.

In FIG. 2*a*, both the first contact angle (A1) and the second contact angle (A2) are small, such as below 45 degrees or below 35 degrees or smaller. In other examples, the second contact angle (A2) may be larger than the first contact angle (A1), such examples are depicted in FIG. 2*b* and FIG. 2*c*.

FIG. 2*b* shows a similar assembly as shown in FIG. 2*a*, but in the present example shown in FIG. 2*b*, the sealing material 3 is of a different final sealing material shape, with a different sealing material surface 3*a* shape. The sealing material surface 3*a* is of a shape providing a first contact angle (A1) which is below 45 degrees, or such as below 35 degrees or such as below 25 degrees, while the shape also provides a second contact angle (A2), which is larger than 45 degrees, such as about 75 degrees or about 90 degrees.

FIG. 2*c* shows another similar assembly as shown in FIG. 2*a* and FIG. 2*b* but in the present example, the final sealing material shape is different than shown in the similar examples. The sealing material surface 3*a* is of a shape providing a first contact angle (A1) which is below 45 degrees, or such as below 35 degrees or such as below 25 degrees, while the shape also provides a second contact angle (A2), which is significantly larger than 45 degrees, such as about 120 degrees, such as about 140 degrees or larger.

In the present examples, shown in FIGS. 2*a*-2*c*, the evacuation hole 4 is of a uniform diameter from the interior surface 2*a* of the glass sheet 2 to the exterior surface 2*b* of the glass sheet 2, but in other embodiments the evacuation hole 4 may comprise several hole parts 4*a*, 4*b*, 4*c* differing in hole diameter.

Figure 3A:
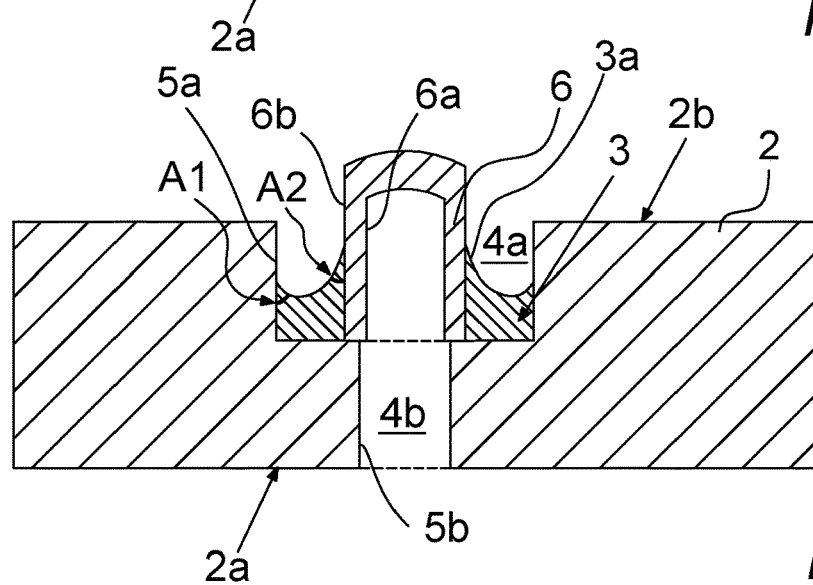
FIG. 3a shows an evacuation hole seal according to the present disclosure, arranged in a countersunk evacuation hole, where the seal material fills out the bottom part of the first part of the evacuation hole and bonds to the side wall of the first evacuation hole and with a first and second contact angle below 45 degrees.
Figure 3B:
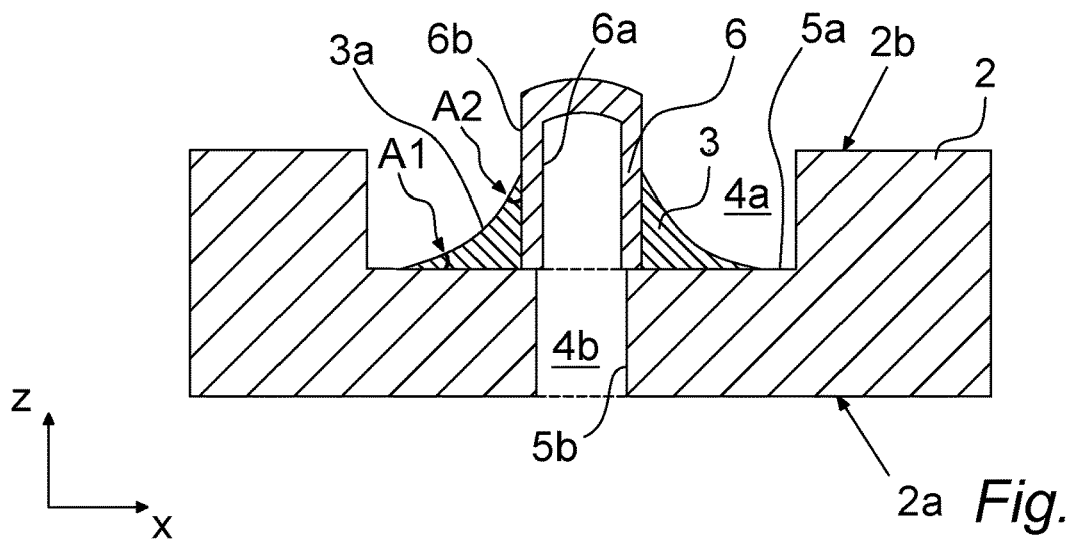
FIG. 3b shows an evacuation hole seal according to the present disclosure, arranged in a countersunk evacuation hole, where the seal material bonds to the bottom wall of the first evacuation hole and with a first and second contact angle below 45 degrees.

FIGS. 3a-3b show a cross-sectional view of an evacuation hole 4, sealing material 3, and a sealed evacuation member 6 of a VIG unit 1 according to the present disclosure. The evacuation hole 4 extends from the interior surface 2a of the glass sheet 2 to exterior surface 2b of the glass sheet 2. In the present examples, the evacuation hole 4 comprises two hole parts, a first hole part 4a of a first hole part diameter d1, arranged nearest the exterior surface 2b of the glass sheet 2 and providing an opening in the glass sheet 2 enclosed by a first hole surface 5a. A second hole part 4b of a second hole part diameter d2 is provided nearest the interior surface 2a of the glass sheet 2 and adjacent to the first hole part 4a. The second hole part 4b also provides an opening in the glass sheet 2 which is enclosed by a second hole part surface 5b. Such evacuation hole 4 geometry, comprising a first 4a and second hole part 4b of different hole part diameters d1, d2 is also referred to as a countersunk hole 4. The countersunk hole 4 provides several benefits, one of which, is the ability to provide the evacuation hole seal by the sealing material 3 primarily below the exterior surface 2b of the glass sheet 2. Furthermore, the different shapes of the sealing material 3 can be provided due to different orientations of the bonding surfaces of the glass sheet 2. Two different sealing material 3 shapes are shown in FIGS. 3a and 3b.

FIG. 3a shows a countersunk evacuation hole 4 having a first hole part 4a being of a first diameter d1 approximately 3-4 times larger than the second diameter d2 of the second hole part 4b. The evacuation tube 6 is located partially above and within the first hole part 4a on a horizontal first hole part surface 5a of the glass sheet 2, extending substantially parallel with the x-axis. The sealing material 3 is provided in the first hole part 4a and bonded to the outer surface 6b of the evacuation tube 6 as well as the first hole part surface 5a. Due to the amount of sealing material 3 and the diameter d1 of the first hole part 4a the sealing material 3 is bonded to a part of the vertical first hole surface 5a extending along the y-direction and the horizontal first hole surface 5a extending along the x-direction. The first contact angle A1 between the sealing material surface 3a and the glass sheet 2 is defined between the vertical hole part surface 4a and the sealing material surface 3a as indicated in FIG. 3a. The first contact angle A1 is small, e.g. below 45 degrees.

FIG. 3b shows a countersunk evacuation hole 4 having a first hole part 4a being of a first diameter d1 approximately 5-6 times larger than the second diameter d2 of the second hole part 4b. The sealing material 3 extends from the outer surface 6b of the evacuation tube 6 to a horizontal part of the first hole part surface 4a, providing thin edge parts of the sealing material 3, with a small first contact angle A1 according to embodiments of the present disclosure, e.g. below 45 degrees. In the present example the sealing material 3 is fully contained in the first hole part 4a.

Figure 4A:
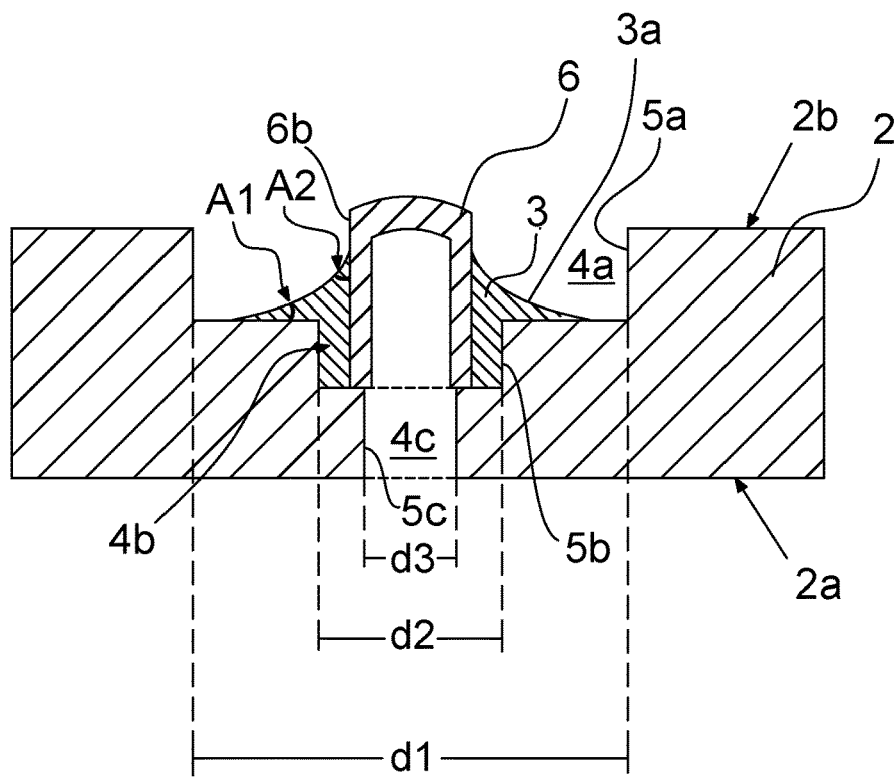
FIG. 4a shows an evacuation hole seal according to the present disclosure, arranged in a double countersunk hole with hole part diameters indicated.
Figure 4B:
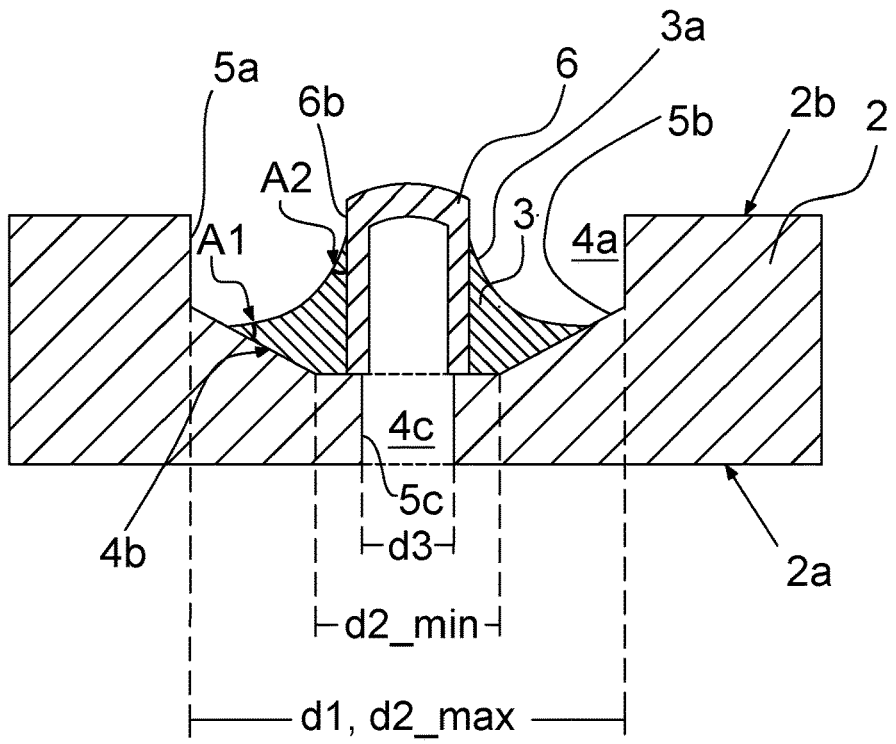
FIG. 4b shows an evacuation hole seal according to the present disclosure arranged in a double countersunk hole with a sloped evacuation hole surface and hole part diameters indicated.
Figure 4B:
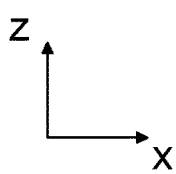
Figure 4C:
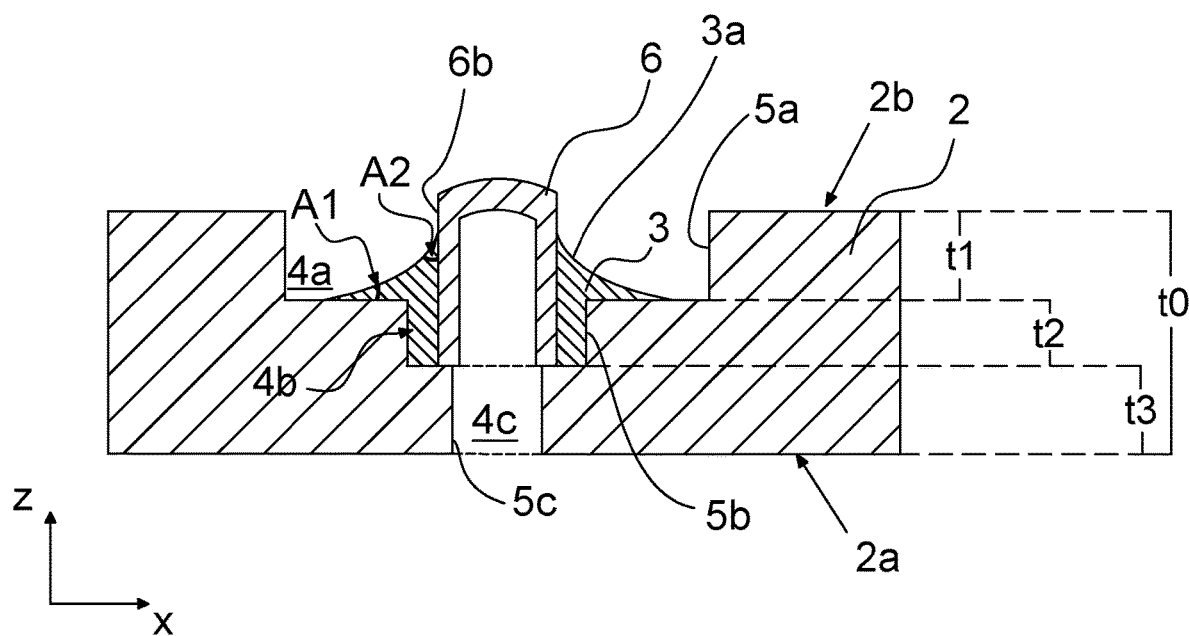
FIG. 4c shows an evacuation hole seal according to the present disclosure arranged in a double countersunk hole with hole part thicknesses indicated.

FIGS. 4a-4c shows a cross-sectional view of an evacuation hole 4, sealing material 3, and a sealed evacuation member 6 of a VIG unit 1 according to the present disclosure. The evacuation hole 4 extends from the interior surface 2a of the glass sheet 2 to exterior surface 2b of the glass sheet 2. In the present examples, the evacuation hole 4 comprises three hole parts, a first hole part 4a of a first hole part diameter d1, arranged nearest the exterior surface 2b of the glass sheet 2 and providing an opening in the glass sheet 2 enclosed by a first hole surface 5a. A third hole part 4c of a third hole part diameter d3 is provided nearest the interior surface 2a of the glass sheet 2 and providing an opening in the glass sheet 2 which is enclosed by a third hole part surface 5c. A second hole part 4b of a second hole part diameter d2 is arranged between the first hole part 4a and the third hole part 4c. The opening provided by the second hole part 4b is enclosed by a second hole part surface 5b. The hole part surfaces 5a, 5b, 5c and the openings 4a, 4b, 4c enclosed by them are connected so as to provide a pathway for gaseous material from the interior gap 7 to the outside, prior to sealing of the evacuation member 6 and from the interior gap 7 to the inner surface 6a of the evacuation member 6, when the evacuation member 6 is sealed in the final VIG unit 1.

Such evacuation hole 4 geometry, comprising a first 4a, second 4b and third hole part 4c of different hole part diameters d1, d2, d3 is also referred to as a double countersunk hole 4. As for the countersunk hole 4, the double countersunk hole 4 provides several benefits, one of which is the ability to provide a location for sealing material 3, which is primarily below the exterior surface 2b of the glass sheet 2. This ability is provided more readily than for with the countersunk hole shown in FIGS. 3a-3b. Also, the double countersunk hole can enable bonding of the sealing material 3 to a larger portion of the glass sheet 2 and of the outer surface 6b of the evacuation member 6, depending on the geometry of the evacuation hole 4. Three different double countersunk hole 4 types arranged with sealing material 3 and evacuation member 6, being an evacuation tube 6, are shown in FIG. 4a-4c.

FIG. 4a shows a double countersunk hole 4, with evacuation hole surface 5a, 5b, 5c which is stepped from the exterior glass sheet surface 2b to the interior glass sheet surface 2a. The stepped evacuation hole surface is provided by the hole parts 4a, 4b, 4c having different hole part diameters d1, d2, d3, decreasing from the exterior surface 2b to the interior surface 2a of the glass sheet 2. The evacuation hole surface extending between the glass sheet surfaces 2a, 2b is mainly made up by connected vertical and horizontal surfaces, where the horizontal plane extends in the x-y plane and the vertical plane extends in the z-direction. The first hole part surface 5a and the second hole part surface 5b comprises both vertical orientated and horizontal orientated surfaces, while the third hole part surface 5c is vertically oriented. In one or more example, the first hole part 4a of the double countersunk hole is of a first diameter d1 between 8-10 mm, the second hole part 4b is of a second diameter d2 between 4-6 mm and the third hole part 4c is if a third diameter d3 between 1.5-2.5 mm.

As shown in FIG. 4a, the evacuation tube 6 is positioned with its tube end on a part of the vertical surface 5b of the second hole part 4b, such that the tube 6 is positioned covering the third hole part 4c. The sealing material 3 is arranged in the first hole part 4a and second hole part 4b, where it is bonded to the outer surface 6b of the evacuation tube 6 as well as a part of the first hole part surface 5a and a part of the second hole part surface 5b. Due to the amount of sealing material 3 and the diameters d1, d2 of the evacuation hole 4, the sealing material 3 provides a bond between the outer surface 6b of the evacuation tube 6, a part of the horizontal first hole surface 5a extending along the x-direction, the vertical second hole surface 5b and horizontal second hole surface 5b extending along the y-direction and x-direction, respectively. The double countersunk hole 4 thereby provides a large bonding surface for the sealing material 3 to adhere to. To avoid any damages during or after the VIG manufacturing process, a small first contact angle A1 is provided. Furthermore, in the present example a small second contact angle A2 is also provided. The first contact angle A1 between in the sealing material 3 and the glass sheet 2, defined between the horizontal first hole part surface 5a and the sealing material surface 3a, as indicated in FIG. 4a, is below 45 degrees, such as below 35 degrees or smaller.

FIG. 4b shows a double countersunk hole 4, similar to the double countersunk hole 4 shown in FIG. 4a, with the difference that the second hole part 4b comprises a tilted second hole part surface 5b. The tilted surface is of gradually decreasing diameter in a direction from the first hole part 4a towards the third hole part 4c. As indicated in FIG. 4b, the tilted surface 5b is of the largest tilted second hole part diameter d2_max at the point where the second hole part surface 5b abuts the first hole part surface 5a, i.e. at the topmost point of the tilted surface 5b of the second hole part 4b. The lowermost point of the tilted surface 5b is connected to a substantially horizontal second hole part surface 5b, extending from the tilted surface to the third hole part surface 5c. The second hole part 4b is of the smallest second hole part diameter d min at the connection between the tilted and the horizontal second hole part surface 5b, as indicated in the FIG. 4b. In one or more examples, the first hole part diameter d1 is between 8-10 mm and the third hole part diameter d3 is between 2.0-2.5 mm. The tilted surface may provide second hole part diameters d2 ranging from 10 mm to 3 mm, such as between 8-3 mm.

As shown in FIG. 4b, the evacuation tube 6 is positioned with its tube end on a part of the vertical surface of the second hole part 5b, such that the tube 6 is positioned covering the third hole part 4c. The sealing material 3 is arranged in the first hole part 4a and second hole part 4b, where it is bonded to the outer surface 6b of the evacuation tube 6 as well as a part of the second hole part surface 5b. Similarly, to the previous example of a double countersunk hole, the present example of a double countersunk hole provides a large bonding surface for the sealing material 3 to adhere to. Both the first contact angle A1 and the second contact angle A2 are small. The first contact angle A1 is preferably below 45 degrees, such as below 35 degrees or smaller. The second contact angle A2 is preferably also below 45 degrees, such as below 35 degrees or smaller.

FIG. 4c shows the double countersunk hole 4 as shown in FIG. 4a, which the thicknesses t1, t2, t3 of the hole parts 4a, 4b, 4c of the evacuation hole 4 indicated. The evacuation hole surface 5a, 5b, 5c is stepped from the exterior glass sheet surface 2b to the interior glass sheet surface 2a. In one or more examples, the first hole part thickness t1 measured along the z-direction may make up between 30-40% of the glass sheet thickness t0. The second hole part thickness t2 measured along the z-direction may also make up between 30-40% of the glass sheet thickness t0, and the third hole part thickness t3 may make up between 20-40% of the glass sheet thickness to. In one or more examples, the first hole part thickness t1 is between 1-2 mm, such as around 1.5 mm, the second hole part thickness t2 is between 1-2 mm, such as around 1.5 mm and the third whole part thickness t3 is between 1-2 mm, such as around 1 mm.

Figure 5A:
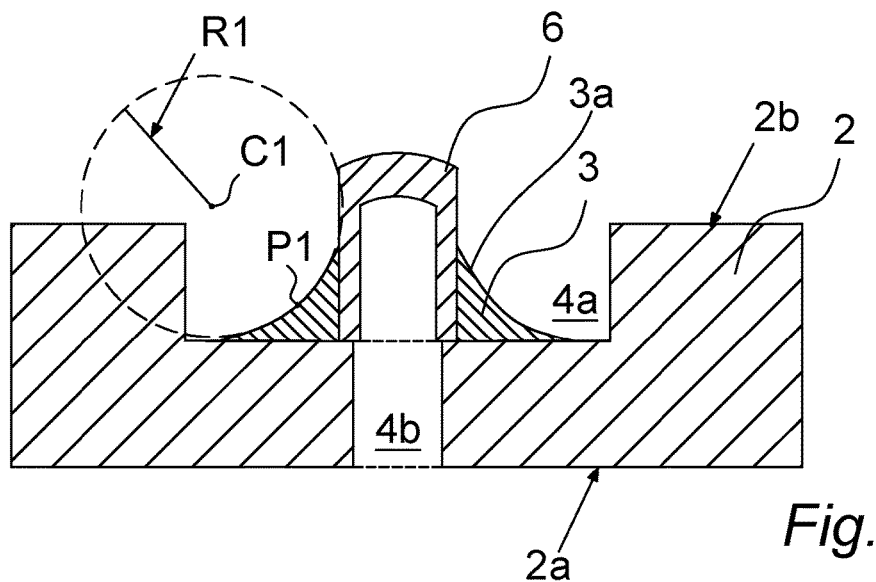
FIG. 5a shows an evacuation hole seal in a countersunk hole with a curved evacuation hole seal surface.
Figure 5B:
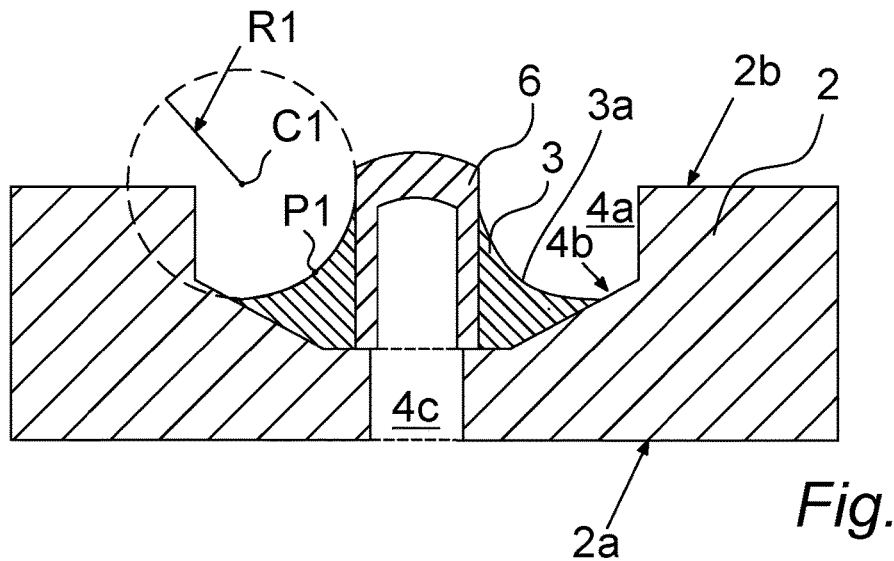
FIG. 5b shows an evacuation hole seal in a double countersunk hole with a curved evacuation hole seal surface.
Figure 5C:
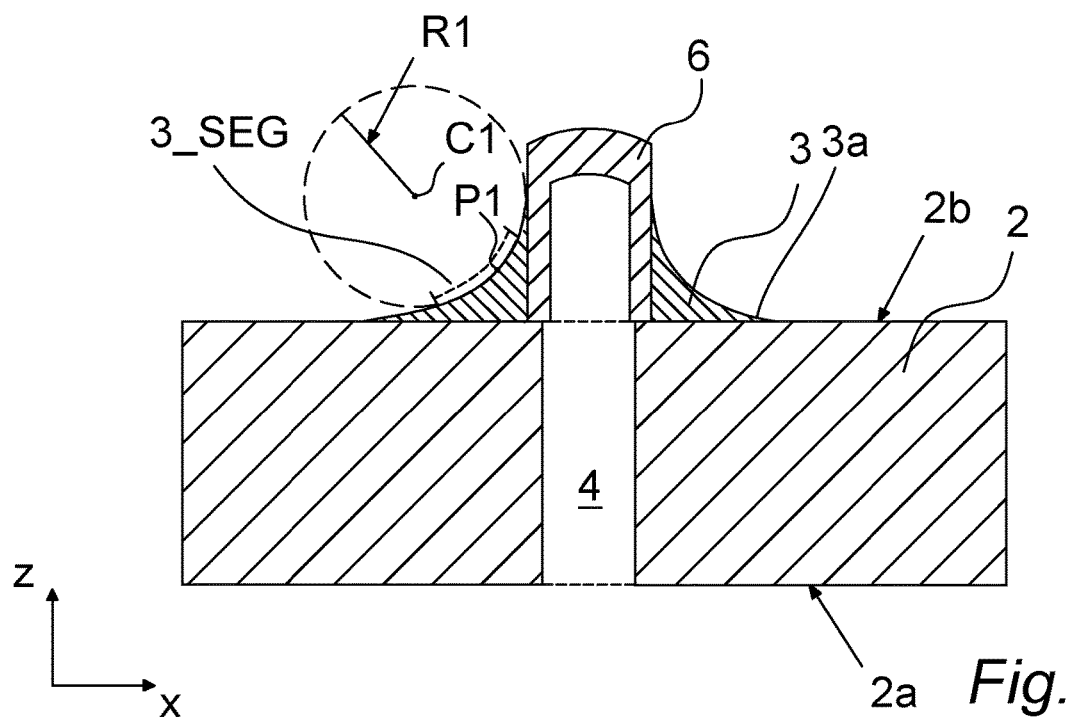
FIG. 5c shows an evacuation hole seal on the glass sheet surface with a curved evacuation hole seal surface.

FIGS. 5a-5c shows a cross-sectional view of an evacuation hole 4, sealing material 3, and a sealed evacuation member 6 of a VIG unit 1 according to the present disclosure. FIG. 5a shows a configuration of a countersunk hole 4 with a sealed evacuation tube 6 and with sealing material 3 between the tube 6 and the glass sheet 2, similar to the configuration shown in FIG. 3b. FIG. 5b shows a configuration of a double countersunk hole 4 with a sealed evacuation tube 6 and with a sealing material 3 between tube 6 and glass sheet 2, similar to the configuration shown in FIG. 4b. FIG. 5c shows a configuration of an evacuation hole 4 with a sealed evacuation tube 6 and with sealing material 3 between tube 6 and glass sheet 2, similar to the configuration shown in FIG. 2a. The sealing material 3 shape comprises thin edges near the contact points between the sealing material surface 3a and the glass sheet 2 and outer evacuation member surface 6b. This is due to the concave shape of the sealing material surface 3a as shown in FIGS. 5a-5c.

In FIG. 5a-5c, the cross-section of the configuration shows a concave sealing material surface 3a having a first radius of curvature (R1) in a first point (P1) on the sealing material surface 3a. The osculating circle, which can be established in the first point P1, is seen to overlap with a significant large part of the sealing material surface 3a. This indicated that the sealing material surface 3a may be of a sealing surface shape having equal radii of curvature (R1) in a significant amount of possible first points along the sealing material surface 3a. In one or more examples, in at least 40% of all points on the sealing material surface 3a extending from the glass sheet surface to the outer tube surface 6b, the sealing material surface 3a shape may be of equal surface curvature having equal radii of curvatures. In one or more embodiments, the radii of curvatures measured in points spread along at least 40% of the sealing material surface 3a may vary by less than 20% or such as by less than 10%. The radius of curvature R1 of the sealing material surface 3a is preferably substantially constant over at least a segment 3_seg of the sealing material surface 3a as shown in FIG. 5c, i.e. varying less than e.g. 10% within the extent of the segment, wherein the segment extends at least 30%, such as at least 35%, or such as at least 40% of the sealing material surface segment 3a.

Examples of Radii

The glass sheets 2 as shown in FIGS. 1-5 may both be tempered glass sheets 2, e.g. thermally tempered glass sheets 2. The evacuation tube 6 may be of an outer diameter between 2-4 mm, such as about 2.7-3.3 mm. The evacuation tube 6 may comprise an inner diameter between 1.5-2.5 mm, such as around 2 mm. The evacuation tube 6 may be made of a glass material.

The invention claimed is:

1. A vacuum insulated glazing unit comprising:
a first glass sheet and a second glass sheet arranged in parallel, wherein each glass sheet comprises an exterior surface and an interior surface, wherein the interior surfaces of the glass sheets are opposing each other and separated by a gap,
one or more support structures arranged in said gap,
a side seal arranged proximate a periphery of said glass sheets and enclosing said gap, and wherein one of said glass sheets comprises
    an evacuation hole enclosed by an evacuation hole surface extending from the interior surface to the exterior surface of a respective said glass sheet,
    an evacuation member being a tube comprising an outer member surface,
    a sealing material providing a hermetic seal between the outer evacuation member surface and said respective glass sheet, and the sealing material having a sealing material surface extending between a first intersection defined between a surface of the respective glass sheet and the sealing material surface and a second intersection defined between the outer evacuation member surface and the sealing material surface,
wherein said sealing material surface at the first intersection has a first contact angle defined between said sealing material surface and the surface of the respective glass sheet, which first contact angle is below 40 degrees, wherein the evacuation hole comprises at least a first hole part, a second hole part and a third hole part adjacently arranged in thickness direction of the respective glass sheet measured along a first axis extending substantially perpendicular to the exterior surface of the respective glass sheet, wherein the first hole part is arranged between the exterior surface of the respective glass sheet and the second hole part, wherein the second hole part is arranged between the first hole part and third hole part, and wherein the third hole part is arranged between the second hole part and the interior surface of the respective glass sheet, wherein the first hole part is of a first diameter, the second hole part is of a second diameter and the third hole part is of a third diameter, wherein the first diameter is larger than the second diameter and the third diameter, and the second diameter is larger than the third diameter, wherein the evacuation member is positioned at least partially in said first hole part and said second hole part (4b), and wherein the evacuation tube is closed such that an opening of the evacuation tube protruding away from the gap is sealed.

2. The vacuum insulated glazing unit according to claim 1, wherein first contact angle is below 35 degrees.

3. The vacuum insulated glazing unit according to claim 1, wherein first contact angle is below 30 degrees.

4. The vacuum insulated glazing unit according to claim 1, wherein first contact angle is below 25 degrees.

5. The vacuum insulated glazing unit according to claim 1, wherein the first diameter is between 6-12 mm.

6. The vacuum insulated glazing unit according to claim 1, wherein the second diameter is between 3-7 mm.

7. The vacuum insulated glazing unit according to claim 1, wherein the third diameter is between 1.5-3.0 mm.

8. The vacuum insulated glazing unit according to claim 1, wherein said sealing material surface is of a surface shape providing a second contact angle defined between said sealing material surface and said outer evacuation member surface, which is below 45 degrees.

9. The vacuum insulated glazing unit according to claim 1, wherein said first contact angle is smaller than a second contact angle defined between said sealing material surface and said outer evacuation member surface.

10. The vacuum insulated glazing unit according to claim 1, wherein at least one of the glass sheets is a tempered glass sheet.

11. The vacuum insulated glazing unit according to claim 1, wherein said sealing material is made from a low melting point solder glass material.

12. The vacuum insulated glazing unit according to claim 1, wherein the sealing material is devoid of lead material.

13. The vacuum insulated glazing unit according to claim 1, wherein the evacuation tube comprises an outer tube surface and an inner tube surface.

14. The vacuum insulated glazing unit according to claim 1, wherein said sealing material surface has a concave surface curvature which at least at a first point on the sealing material surface has a first radius of surface curvature measured in a plane perpendicular to the exterior glass sheet surface is in a range of 0.5 to 4.0 mm.

15. The vacuum insulated glazing unit according to claim 14, wherein the first radius of surface curvature of the sealing material surface at any first point located within a sealing material surface segment, defined as representing at least 30% of the sealing material surface, is within said range.

16. The vacuum insulated glazing unit according to claim 14, wherein at least 30% of the sealing material surface segment is of a radius of curvature, which is varying with less than 10%.

* * * * *